Patented Mar. 24, 1931

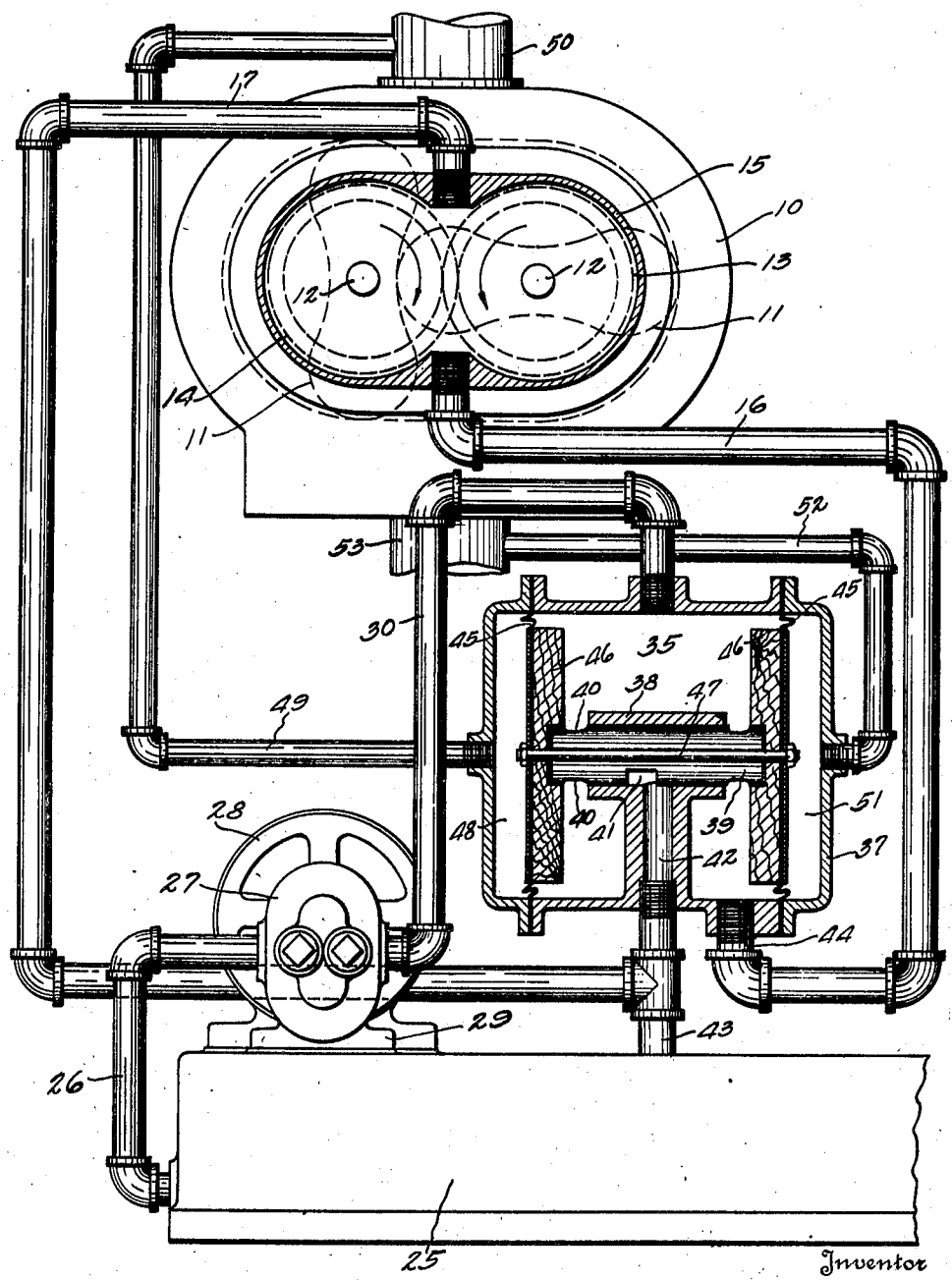

1,797,233

UNITED STATES PATENT OFFICE

HARRY A. HUEBOTTER, OF LAFAYETTE, INDIANA, ASSIGNOR TO THE P. H. & F. M. ROOTS COMPANY, OF CONNERSVILLE, INDIANA, A CORPORATION OF INDIANA

FLUID METER

Application filed November 22, 1926. Serial No. 149,974.

This invention relates to fluid metering, and more particularly to fluid-metering instruments having one or more displacement members movably mounted within a casing.

With meters of this character it is usual to employ a construction which is generally the same as that of the well-known Roots blower. In such meters there are usually employed two lobed intermeshing displacement members which are rotatably mounted within a casing, the gas or other fluid which passes through the casing furnishing the torque for effecting turning of these members to drive suitable counting or registering mechanism. There is, of course, some clearance betwen the displacement members and the casing and as there is also a differential in pressure across the displacement members some leakage through this clearance results, the amount being dependent on the differential pressure and therefore subject to variation during use of the instrument. To compensate for this leakage, which is generally referred to as "slip" or "slippage," the registering mechanism is usually calibrated so that it will correct for such slippage and therefore indicate directly, and within a suitable range of accuracy, the actual amount of fluid passed.

In the preferred embodiment of this invention, illustrated herein, the pair of rotatable lobed intermeshing displacement members of the meter are positively driven by an extraneous source of power which furnishes the torque for driving them at a speed which corresponds to the normal rate of flow of the fluid through the meter and this gives rise to the same practical effect as substantially zero differential pressure across these displacement members.

One of the principal objects of the invention then is to provide a fluid meter in which slippage may occur which is constructed to be positively driven.

Another object of the invention is to control the driving means to effect operation of the displacement members at a rate coordinated with the rate of flow of the fluid being metered to control slippage.

Still another object of the invention is to provide a fluid meter having a plurality of rotatable lobed intermeshing displacement members which are positively driven by an extraneous driving source of power at a speed of rotation commensurate with the rate of flow of fluid being metered so that the displacement members may operate irrespective of any driving force of or on the fluid being metered.

Further objects and advantages of the invention will be more fully set forth in the following description and claims, and in the drawing in which, the single figure represents an end elevation of a form of meter embodying the invention, with parts shown in section to more clearly illustrate the construction.

Referring to the drawing more particularly by reference numerals 10 indicates the casing which is provided with a pair of intermeshing lobed displacement members 11 each of which is mounted on a rotatable shaft 12 and which interfit one with the other. The two displacement members 11 are shown as of the usual lobed or figure 8 construction and fit snugly within the casing, and are supported by suitable bearings, so that when rotated there will be positive displacement or measuring of the fluid passing through the casing; and since the displacement for each revolution is constant the amount of this displacement during any given period may be determined from the number of revolutions of the rotatable intermeshing members. The number of revolutions of the intermeshing members may be counted by a suitable indicating or measuring device operated by a gear train attached to one of the shafts 12 in any suitable manner.

Heretofore devices of this sort have been really low powered fluid motors, constructed to generate enough power as the fluid flows through the casing to drive the counting mechanism. There being clearance, leakage naturally occurs and consequently the actual displacement is somewhat less than the theoretical. In this invention the rotatable lobed members 11 are positively driven by the two spur gears 13 and 14 which fit neatly within an auxiliary housing 15 so as to provide a gear fluid motor. The gears 13 and 14 are positively rotated by a supply of oil through the conduit 16 and the oil thus travels into the auxiliary housing 15 to drive the intermeshing gears in the direction of the arrows, the oil then passing out through the outlet pipe 17. The gears 13 and 14 being on the same shafts as the lobed displacement members 11 will thus act as timing gears to maintain the displacement members in their proper relative positions and also positively drive the lobed members at the proper speed as will now be explained. Of course, conventional timing gears may also be used if desired.

An oil-supply tank 25 is provided with a quantity of oil and serves as an oil reservoir through which oil may be drawn through a pipe 26 leading to the intake side of an oil pump, of any suitable character, designated generally 27, this oil pump being positively driven by a constant speed motor of any suitable character, 28. The pump 27 is mounted upon a bracket 29 upon the oil reservoir 25. The oil is forced through the conduit 30 by the pump 27 and passes into an inner chamber 35 of a differential pressure mechanism comprising a closed casing 37 within which is a bearing bracket 38 which mounts a reciprocable controlling valve member 39 for endwise movement therein. The controlling member is shown as a hollow sleeve provided with openings 40 in those portions of the sleeve adjacent the ends of the bearing member 38. The oil is thus permitted to freely enter the interior of the sleeve 39 and may then pass through a control opening 41 which communicates with a passage 42 leading to the return pipe 43 through which some of the oil may flow back to the reservoir 25.

A part of the oil which is forced into the chamber 35 flows through an outlet passage 44 which is connected to the passage 16 supplying oil to the fluid motor previously described. The amount of oil flowing to the fluid motor is controlled by the amount of opening of the valve passage 41 which increases or reduces the resistance of the by-pass flow of oil back to the supply reservoir and thus controls the amount of oil flowing to the fluid motor.

The amount of opening of the valve passage 41 is controlled automatically in accordance with the pressure differential between the intake and the output sides of the fluid meter. The chamber 35 of the controlling device is closed at opposite sides thereof by flexible diaphragms 45 to which are centrally attached the plates 46 fastened together and to the valve sleeve 39 by means of the bolt 47. A pressure chamber 48 is provided on one side of one flexible diaphragm 45 which communicates through a pipe 49 with the outlet or delivery side 50 of the casing 10. A second closed pressure chamber 51 is likewise provided at the other end of the closed casing 35, which communicates through the pipe 52 with the intake side 53 of the metering instrument and is maintained at the same pressure as the intake side of the meter.

In normal operation of the meter the sleeve 39, as shown in the figure, is so positioned that just sufficient oil is forced through the passage 44 to maintain the driving force or torque of the motor gears 13 and 14 at such a value that the displacement members will rotate at a rate bearing any desired relation to the normal rate of flow of the fluid being metered. Preferably this rate of rotation is such that there will be no difference in pressure between the intake and outlet side of the meter. The two chambers 48 and 51 provided at opposite sides of the chamber 35 of the controlling valve will thus be equalized to permit the valve sleeve 39 to remain in its normal operative position. In this position the amount of oil which is supplied to the fluid pump will supply just sufficient power to the displacement lobed members of the meter so that the lobed members will be rotated without any assistance or force being supplied from the fluid itself which is being measured and without supplying any force to the main fluid flow through the meter. There will thus be no tendency for the fluid to slip past the intermeshing members. In the event that the amount of fluid passing through the meter is increased or decreased the difference in pressure between the intake and the outlet sides of the meter will instantaneously control the position of the sleeve 39 to permit more or less oil to by-pass into the passage 42 and return to the reservoir 25 which will thus change the rate of flow of the oil to the chamber 35 to correct the speed of the meter displacement members.

The provision of a driving motor of the fluid gear type comprising small tooth and comparatively large diameter gears, for the supply of extraneous power to the lobed displacement members permits a sufficient torque to be obtained without necessitating a large flow of oil through the gear motor, and a comparatively small reservoir and small and light weight parts can be used. Of course any other suitable motor capable of speed control may be used for driving the displacement members.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. In a fluid-handling apparatus of the character described comprising, in combination, a casing having a fluid passage therethrough, rotary fluid metering means mounted within said casing, an exterior source of power, means operably connecting said exterior source of power with said metering means, governing means associated with said exterior source of power, and means coordinating the governing means with pressure conditions on opposite sides of the metering means to act on the governing means so as to effect controlled rotation of said metering means.

2. In a fluid-metering instrument, in combination, metering mechanism for the fluid, a casing for said mechanism, an extraneous source of power, a driving connection for driving said mechanism from said extraneous source of power, control means controlling the application of power to the metering mechanism so that said metering mechanism is driven at a speed to produce substantially zero differential in pressure in said casing adjacent opposite sides of said mechanism, and connections from said control means to opposite sides of the metering mechanism.

3. In a fluid metering instrument, metering displacement means operated in accordance with the passage of fluid, a driving device for said displacement means, and control means for said driving device comprising a fluid supply pipe, a pressure differential valve means, connections from said valve means to opposite sides of said displacement means to control the flow of fluid through said supply pipe and effect the operation of the driving device to cause said displacement means to be driven independently of the fluid being metered.

4. In combination, in a fluid-measuring instrument, a casing, displacement members therein for metering the flow of fluid through said casing, a fluid motor for driving said members, means for supplying operating fluid for operating said fluid motor, a differential pressure valve means controlling the speed of said motor, and conduits from said valve means to the casing on opposite sides of said displacement members, said valve means to be actuated by the pressure exerted thereon to govern the supply of operating fluid to said motor to thereby control the speed of said motor to cause a negligible pressure being exerted on the members by the fluid measured.

5. In combination, in a fluid-measuring instrument, a casing, a pair of intermeshing displacement members therein for metering the flow of fluid through said casing, a fluid motor for driving said members, means for supplying operating fluid for operating said fluid motor, a differential pressure valve means controlling the speed of said motor, and fluid conduits from said valve means to the fluid metering instrument on opposite sides of said displacement members, said valve means being adjusted to cause operation of said motor at a speed commensurate with the rate of flow of the fluid being metered.

6. In combination, in a fluid-measuring instrument, a casing, a pair of rotative lobed intermeshing displacement members therein for metering the flow of fluid through said casing, parallel shafts for said members mounted in said casing, a fluid motor for driving said shafts and maintaining the same in proper timing relation comprising intermeshing spur gears on said shafts, a fluid pump for operating said fluid motor, a differential pressure valve means for controlling the speed of said motor, and fluid conduits from said valve means to the intake and the output sides of said displacement members, said valve means being operable in accordance with the differential pressures at opposite sides of said displacement member to maintain the speed of said motor proportional to the rate of flow of fluid through said casing to control the pressure exerted on the members by the fluid measured.

7. In a fluid-metering instrument, metering mechanism for the fluid constructed to permit slippage, and driving means for said mechanism adapted to deliver a driving torque to said metering mechanism, control means for said driving means, and connections between the control means and opposite sides of the metering mechanism to render said control means responsive to pressure conditions on opposite sides of the meter for varying the torque of the driving mechanism in accordance with the pressure across the metering mechanism.

8. Fluid handling apparatus of the character described comprising, in combination, a casing having a fluid passage therethrough, rotary fluid metering means mounted within said casing, an exterior source of power, a driving connection for driving said metering means from said exterior source of power, governing means controlling said exterior source of power and acting thereon to effect controlled rotation of said driving connection at a speed of rotation controlled to prevent substantial leakage past the fluid metering means, and connecting means operably connecting said governing means with the said casing on opposite sides of the metering means so the governing means is responsive to pressure conditions on opposite sides of the metering means.

9. In a fluid metering instrument, in combination, metering mechanism for the fluid, a casing for said mechanism, an extraneous source of power, means for driving said mechanism from said extraneous source of power at a speed to produce substantially zero differential in pressure in said casing adjacent opposite sides of said mechanism, said means including control mechanism and connecting means therefor extending to the casing on opposite sides of the metering mechanism so the control mechanism is responsive to pressure conditions on opposite sides of said metering mechanism.

10. In a fluid flow measuring apparatus the combination comprising a displacement device adapted to permit the passage therethrough of the fluid whose flow is to be measured and provided with an element rotatable in the fluid in harmony with its flow, a motor for driving said element, and means including a member responsive to the static pressures of the fluid at opposite sides of said device, for controlling the speed of said motor so as to maintain a substantially constant difference between said pressures.

In testimony whereof I hereto affix my signature.

HARRY A. HUEBOTTER.